(12) United States Patent
Zhou et al.

(10) Patent No.: US 9,207,852 B1
(45) Date of Patent: Dec. 8, 2015

(54) INPUT MECHANISMS FOR ELECTRONIC DEVICES

(75) Inventors: Dong Zhou, San Jose, CA (US); Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 946 days.

(21) Appl. No.: 13/332,156

(22) Filed: Dec. 20, 2011

(51) Int. Cl.
*G06F 3/0488* (2013.01)

(52) U.S. Cl.
CPC .................................. *G06F 3/0488* (2013.01)

(58) Field of Classification Search
CPC ............ G06F 2203/04101; G06F 2203/04808; G06F 2203/04108; G06F 3/04842
USPC .......... 715/768, 773, 796, 863, 834; 345/175; 386/190
See application file for complete search history.

(56) References Cited

U.S. PATENT DOCUMENTS

| | | | |
|---|---|---|---|
| 6,501,464 B1 * | 12/2002 | Cobbley et al. | 345/173 |
| 6,750,848 B1 * | 6/2004 | Pryor | 345/168 |
| 7,515,135 B2 * | 4/2009 | Varanda | 345/156 |
| 7,653,883 B2 * | 1/2010 | Hotelling et al. | 715/863 |
| 8,004,057 B2 | 8/2011 | Tian et al. | |
| 8,042,044 B2 * | 10/2011 | Van Leeuwen | 715/702 |
| 8,237,654 B2 * | 8/2012 | Kang | 345/156 |
| 8,237,666 B2 * | 8/2012 | Soo et al. | 345/173 |
| 8,373,666 B2 * | 2/2013 | Jung | 345/173 |
| 8,508,347 B2 * | 8/2013 | Pihlaja | 340/407.2 |
| 8,659,548 B2 * | 2/2014 | Hildreth | 345/158 |
| 8,736,583 B2 * | 5/2014 | Anderson et al. | 345/175 |
| 2005/0162385 A1 | 7/2005 | Doi et al. | |
| 2005/0190275 A1 | 9/2005 | Higashitsutsumi et al. | |
| 2006/0033724 A1 * | 2/2006 | Chaudhri et al. | 345/173 |
| 2007/0008279 A1 | 1/2007 | Benford et al. | |
| 2009/0080526 A1 | 3/2009 | Vasireddy et al. | |
| 2009/0286572 A1 | 11/2009 | Rhoads et al. | |
| 2010/0138785 A1 * | 6/2010 | Uoi et al. | 715/810 |
| 2010/0141590 A1 * | 6/2010 | Markiewicz et al. | 345/173 |
| 2010/0178903 A1 | 7/2010 | Tofighbakhsh et al. | |
| 2010/0199232 A1 * | 8/2010 | Mistry et al. | 715/863 |
| 2010/0315413 A1 * | 12/2010 | Izadi et al. | 345/419 |
| 2011/0102588 A1 | 5/2011 | Trundle et al. | |
| 2011/0143811 A1 | 6/2011 | Rodriguez | |
| 2011/0296333 A1 * | 12/2011 | Bateman et al. | 715/773 |
| 2011/0310005 A1 * | 12/2011 | Chen et al. | 345/156 |

(Continued)

OTHER PUBLICATIONS

"Final Office Action dated Oct. 4, 2013", U.S. Appl. No. 13/170,164, 32 pages.

(Continued)

*Primary Examiner* — Andrew Tank
(74) *Attorney, Agent, or Firm* — Novak Druce Connolly Bove + Quigg LLP

(57) ABSTRACT

Elements of a graphical user interface, such as a virtual keypad, can have display characteristics adjusted based upon aspects such as a relative hand or finger position of a user. In one example, the transparency of a keypad used to enter text on a portable computing device can be adjusted based on the distance of a user's hand, such that the user can still view content displayed through the interface. A user can also select elements, such as text fields for text entry, by adjusting a relative position of the user's hand and performing a selection gesture or other such action. Various types of functionality can be activated in response to a selection gesture, such as to display a keypad of an appropriate transparency.

25 Claims, 8 Drawing Sheets

(56) References Cited

U.S. PATENT DOCUMENTS

2012/0019721 A1    1/2012   Choi et al.
2012/0194432 A1    8/2012   Deluca
2012/0229377 A1*   9/2012   Kim et al. .................. 345/157
2012/0268391 A1*  10/2012   Somers ....................... 345/173
2012/0268424 A1   10/2012   Kim
2013/0106898 A1*   5/2013   Saint-Loubert-Bie
                            et al. ........................... 345/592

OTHER PUBLICATIONS

"Non Final Office Action dated Mar. 27, 2013", U.S. Appl. No. 13/170,164, 28 pages.

"Non-Final Office Action dated Jun. 10, 2014," U.S. Appl. No. 13/170,164, 32 pages.

"Final Office Action dated Nov. 13, 2014," U.S. Appl. No. 13/170,164, 36 pages.

* cited by examiner

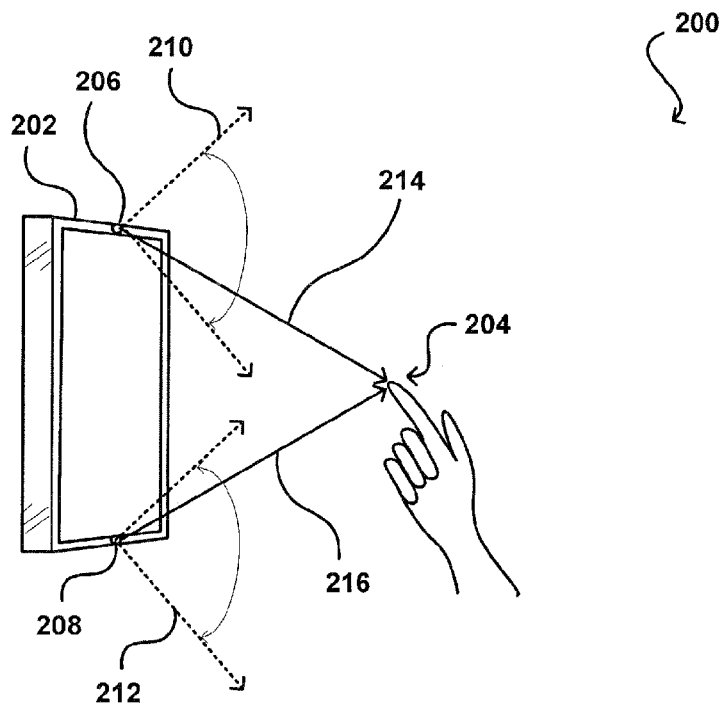
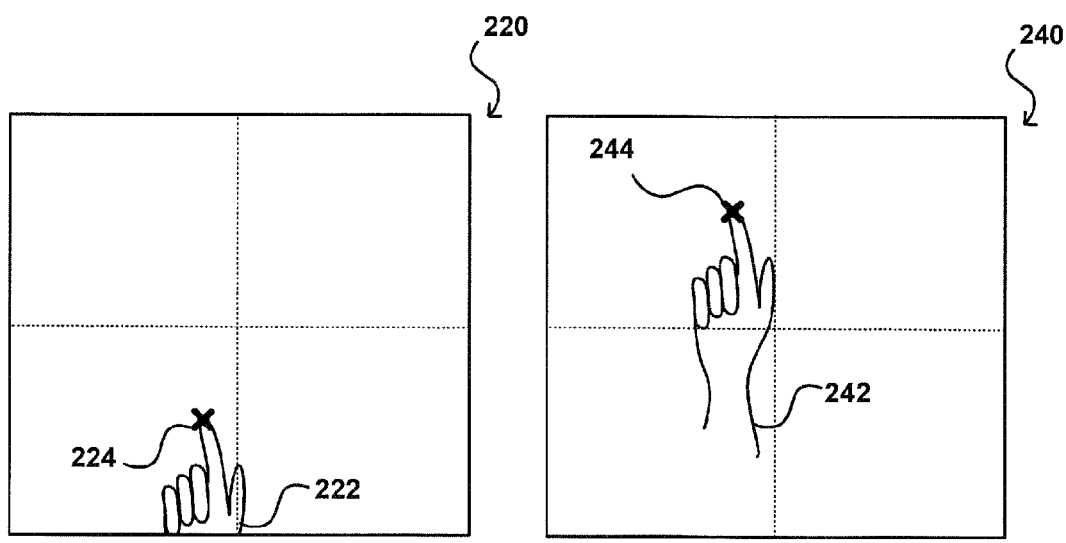
FIG. 2(a)
FIG. 2(b)    FIG. 2(c)

INPUT MECHANISMS FOR ELECTRONIC DEVICES

BACKGROUND

People are increasingly utilizing portable electronic devices to perform various types of tasks. While the small size and light weight of these devices provide various advantages, these aspects come with certain limitations as well. For example, the size of a display screen on many of these devices is relatively small, less than four inches diagonally in many instances, such that it can be difficult to precisely select items displayed on a touch screen. When attempting to type on a touch screen, for example, the relative size of the human finger to the touch screen requires that each letter occupy a considerable amount of space on the display, which can require a virtual keypad to cover half the screen or more in certain devices and orientations. Such display not only obscures a significant amount of content that otherwise would be displayed on the screen, but also can cause user frustration when the user has to manually jump back and forth between having the keypad displayed and not having the keypad displayed, such as when the user cannot both see the information displayed and type text relating to that information.

BRIEF DESCRIPTION OF THE DRAWINGS

Various embodiments in accordance with the present disclosure will be described with reference to the drawings, in which:

FIGS. 2(a), 2(b), and 2(c) illustrate an example process for locating the relative position of a user's hand or at least one finger that can be used in accordance with various embodiments;

DETAILED DESCRIPTION

Figure 1A:
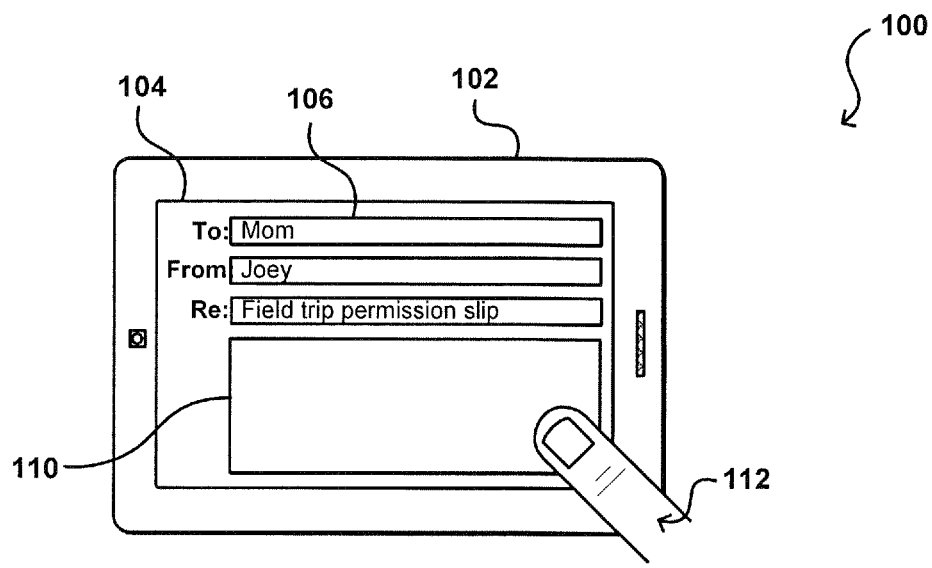
FIGS. 1(a) and 1(b) illustrate an interface states enabling a user to enter text through a virtual keyword displayed on a display screen of an electronic device using a conventional technique of the prior art.

Systems and methods in accordance with various embodiments of the present disclosure may overcome one or more of the aforementioned and other deficiencies experienced in conventional approaches to providing input to an electronic device. In particular, various embodiments can determine and utilize the relative position of a feature of a user, such as a hand or fingertip, as input to control one or more aspects of a user interface provided by an electronic device. The relative distance and/or position can be determined in two or three dimensions using any appropriate technology, such as one or more cameras, a distance detector, and the like. Information such as the distance to a user's hand can be used to control the appearance of an interface element, such as a virtual keypad or keyboard displayed on a display screen or other such element. In order to minimize the blocking of content by the interface element, the element can be transparent (or otherwise not rendered or visible) when a user's hand or finger is at least a minimum distance away. This minimum distance can be personalized by a user, or dynamically adjusted, based on factors such as observed distance from the device. When the monitored feature is within that distance, the device can adjust a transparency of the interface element by an amount proportional to the current distance, such that when the feature is close enough to the device the interface element can be substantially opaque, or at least fully rendered, whereby the user can interact with the interface element. In one example, this can involve fully rendering a virtual keypad when at least one of the user's fingers or thumbs is close enough to type on the virtual keypad. If the user wants to see information that is otherwise obstructed by the keypad, the user can pull the finger, thumb, or other monitored feature away which can result in the keypad becoming more transparent, such that the user can see "through" the keypad.

In some embodiments a user can perform one or more gestures or actions to select a field or other element in which to enter text or other such information. For example, the device might track the relative position of a user's fingertip in addition to distance. As the user moves the finger laterally in a plane parallel to a display screen, for example, the relative position can be monitored and used to highlight or otherwise indicate at least one interface element corresponding to that relative position. As the user moves a fingertip down relative to the device in one example, the fields on the screen might be highlighted one at a time from top to bottom in an order and position that tracks the user motion. In some embodiments, a cursor or other indicator might be displayed to indicate a location on the screen to which the current relative position of the user's fingertip is mapped. When the user wants to select an element that corresponds to the current relative position, the user can perform a selection action. The action can involve the user's other hand, such as by squeezing the device, pressing a button, or otherwise providing input, or can involve the tracked fingertip, such as where the user performs a pinch gesture bringing the fingertip in contact with the user's thumb. Upon detecting such a gesture, the device can select the currently highlighted interface element. Certain functions might be activated in response to the selection. For example, if the element is a textbox then a virtual keypad might be activated allowing the user to enter text into that particular text box. If the element is an image, the user might be able to drag and drop the image to another location on the interface. The functionality provided can depend upon factors such as the type of element selected and the type of gesture performed.

Various other applications, processes, and uses are presented below with respect to the various embodiments.

As discussed, providing input to a small or portable electronic device can be difficult due at least in part to the limited size of the device. For example, FIG. 1(a) illustrates an example state 100 of a portable computing device 102 wherein an interface is displayed to the user. This example relates to a portable device that includes a display screen 104, touch-sensitive or otherwise, which can display various graphical elements as part of a graphical user interface (GUI)

that can enable the user to input various characters or text, or provide another such input, using various approaches discussed herein. The interface displayed includes a number of fields 106, 108, 110 in which the user is able to provide text input. In conventional approaches, the user can select one of the fields 110 by touching that field with the user's finger 112 or performing another such action.

Figure 1B:
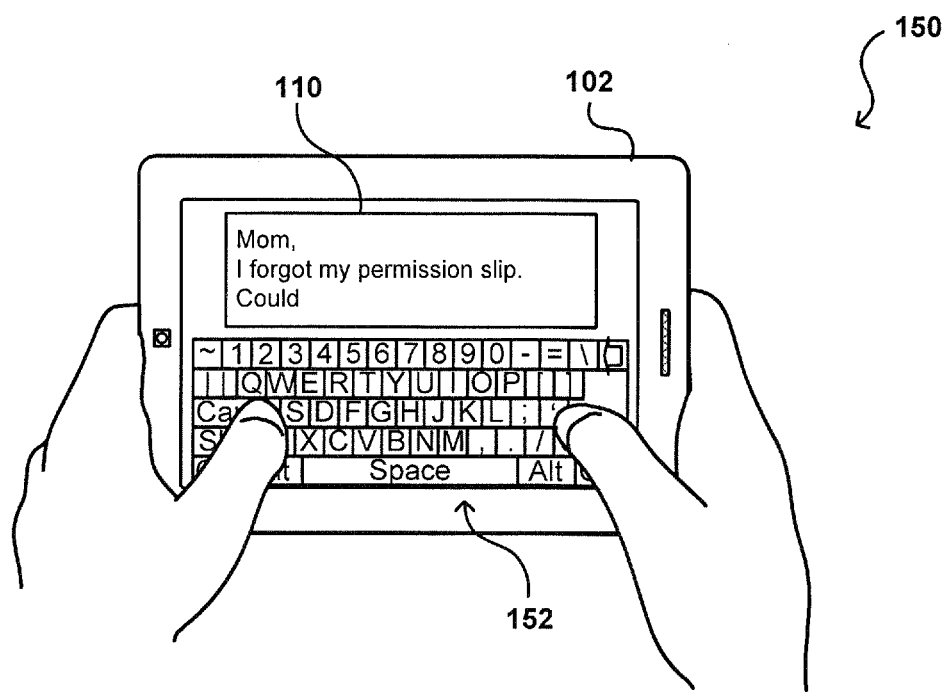

In response to selecting a text field using one or these conventional approaches, a virtual keypad 152 is displayed on the interface as illustrated in the example state 150 of FIG. 1(*b*). As discussed, the size of each virtual key on the keypad needs to be large enough that the user can easily select that key with a thumb or finger without accidentally selecting an adjacent key. As such, the keypad must occupy a significant portion of the display, taking up approximately half of the display space in the figure. In addition, the interface must display at least a portion of the selected field 110 such that the user can see what is being entered, in case the user needs to fix typographical errors, wants to proofread the text entry, etc. As such, a significant portion of the content that was displayed in FIG. 1(*a*) cannot be seen when the keypad is displayed, as illustrated in FIG. 1(*b*). If the user needs to refer back to content that was previously displayed, such as to view the spelling of a name or other such information, the user must typically manually close the virtual keypad, find the information, reselect the field to bring the keypad back up, and select the location where the user left off in order to keep typing. Such a process can be frustrating for the user, or at can least degrade the user experience.

In order to improve upon such conventional input methods, approaches in accordance with various embodiments attempt to determine information such as the relative distance and/or location of a feature of the user that is capable of providing (or assisting in providing) such input. For example, a device can attempt to determine whether the user's hand is close enough to the device that the user can type into the device. If the hand is not sufficiently close, any keypad or other input mechanism can be hidden or otherwise not fully displayed or rendered, in order to minimize the obscuring of information. Similarly, the distance can be monitored over time such that an input mechanism can be at least partially displayed when the user feature is close enough to provide input, but can enable the content on the display to be viewable by an amount proportional to a distance of that feature from the device. Pulling a user's thumbs away from the device, for example, can cause the input element to become increasingly transparent or small enough to allow the other content on the interface to be at least partially displayed. Such an approach can provide various advantages as discussed and suggested herein.

FIGS. 2(*a*), (*b*), and (*c*) illustrate one example approach to determining a relative distance and/or location of at least one feature of a user that can be utilized in accordance with various embodiments. In this example, input can be provided to a computing device 202 by monitoring the position of the user's fingertip 204 with respect to the device. In some embodiments, a single camera can be used to capture image information including the user's fingertip, where the relative location can be determined in two dimensions from the position of the fingertip in the image and the distance determined by the relative size of the fingertip in the image. In other embodiments, a distance detector or other such sensor can be used to provide the distance information. The illustrated computing device 202 in this example instead includes at least two different image capture elements 206, 208 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 206 is able to see the fingertip 204 of the user as long as that feature is within a field of view 210 of the upper camera 206 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 214 of the fingertip with respect to the upper camera. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera 208 in FIG. 2(*a*) is also able to image the fingertip 204 as long as the features is at least partially within the field of view 212 of the lower camera 208. Using a similar process to that described above, appropriate software can analyze the image information captured by the lower camera to determine an approximate direction 216 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a 45 degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance to a feature of a user. For example, a device can determine the size of a feature (e.g., a finger, hand, pen, or stylus) used to provide input to the device. By monitoring the relative size in the captured image information, the device can estimate the relative distance to the feature. This estimated distance can be used to assist with location determination using a single camera or sensor approach.

Further illustrating such an example approach, FIGS. 2(*b*) and 2(*c*) illustrate example images 220, 240 that could be captured of the fingertip using the cameras 206, 208 of FIG. 2(*a*). In this example, FIG. 2(*b*) illustrates an example image 220 that could be captured using the upper camera 206 in FIG. 2(*a*). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 222, at least one point of interest 224, here the tip of the user's index finger, is determined. As discussed above, the software can use the location of this point with information about the camera to determine a relative direction to the fingertip. A similar approach can be used with the image 240 captured by the lower camera 208 as illustrated in FIG. 2(c), where the hand 242 is located and a direction to the corresponding point 244 determined. As illustrated in FIGS. 2(b) and 2(c), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

Figure 3A:
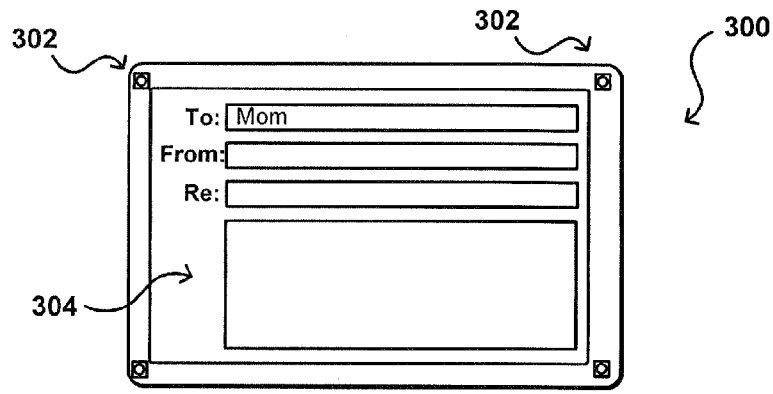
FIGS. 3(a), 3(b), and 3(c) illustrate example interface states wherein a transparency (or opacity) value of a virtual keypad adjusts with a change in user hand position in accordance with various embodiments.

In some embodiments, the distance between a feature such as a user's hand or fingertip can be used to adjust the transparency or rendering of various types of interface elements. For example, FIG. 3(a) illustrates an example state 300 of a computing device wherein one or more cameras 302 are configured to capture image information to be used in detecting a hand or other feature of the user as discussed elsewhere herein. In this example, no hand or similar feature is detected within a specified distance of the device, such that no virtual keypad is displayed with the contents 304 of the interface. The specified distance can be any appropriate distance, such as may be on the order of inches, and can be specified by any appropriate party in any appropriate way, such as by being manually selected by a user or stored by a provider in a configuration file. The distance also can be adjustable either manually or automatically, such as in response to monitoring behavior of the user. For example, a device can determine a maximum distance that the user's thumbs travel while typing. The device can then use this distance (D), or to be conservative a multiple of this distance (e.g., 1.2*D), as the distance past which no keypad or other such interface element or feature is displayed.

Figure 3B:
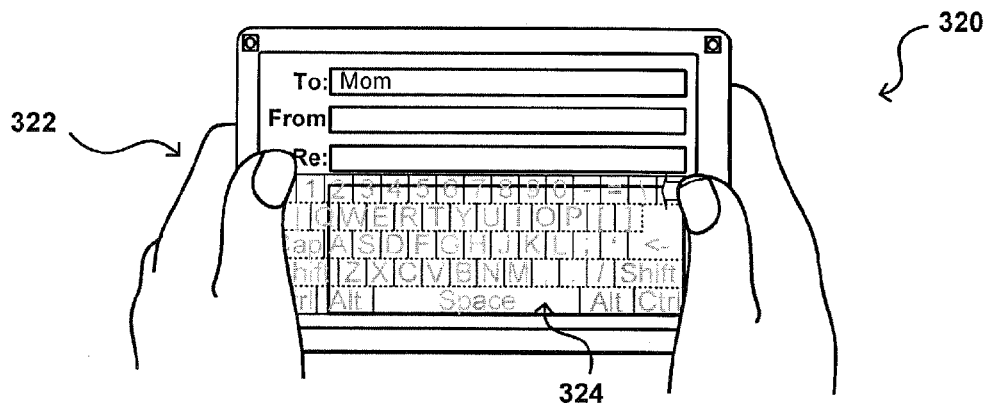

In the example state 320 of the computing device illustrated in FIG. 3(b), the user has brought the user's hands to a position 322 near the device, in this case to a position where the user is actually holding the device, although such contact is not required in at least some embodiments. By bringing the user's hands to within a specific distance of the device, the device can cause a virtual keypad 324 to be displayed on the interface. In this example, however, the user's thumbs are still a distance from the screen and are far enough away that the user cannot quickly type on the screen (at least within a response time of the device). In such a configuration, where the hands, fingers, or thumbs are within a specified distance of the device, a version of the keypad can be displayed. When the fingers or thumbs are still a distance away from the screen, however, the keypad might not be fully rendered or, as illustrated, might have a level of transparency that enables the user to still see the other content at that location on the interface. Such an approach enables the user to view all (or most) content on the interface while not typing. In order to facilitate typing, however, a partially transparent rendering of the keypad 324 can be displayed such that when the user is ready to type information on the display, the user can determine where to aim the user's fingers or thumbs, etc.

Figure 3C:
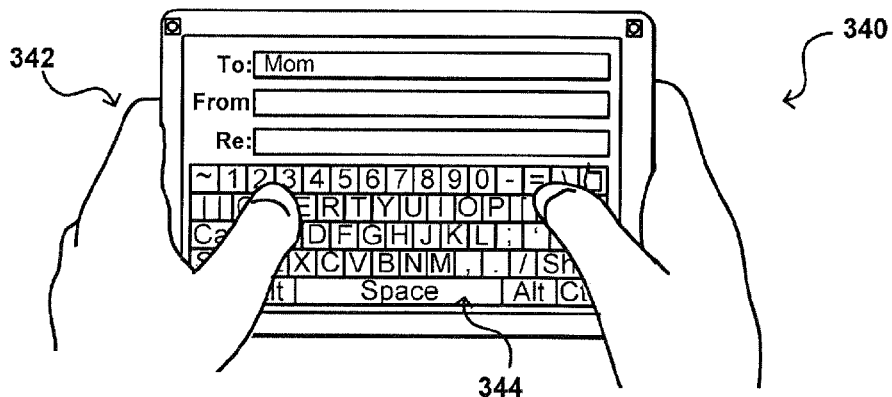

When the user's thumbs in this example get within a specified range of the display, such as in the state 340 illustrated in FIG. 3(c), the keypad might be fully rendered or opaque, or in a least transparent state, such that the user can easily provide text input using the keypad. In some embodiments where the cameras have sufficiently wide angle lenses the range can be very close to the screen, such as on the order of a centimeter or less. In some embodiments, the cameras may not be able to see the thumbs when they are very close to the screen, and the device might fully render the keypad whenever the thumbs enter this "dead zone" from the point of view of the cameras. In still other embodiments, capacitive approaches or other techniques can be used when the features are closer to the device than can be viewed by the cameras. Various other approaches can be utilized as well within the scope of the various embodiments.

Such an approach provides a user with the ability to control the amount of impact the keypad has on the ability to view content on the display. When a user is not in a position to type then the virtual keypad may not be displayed, and the keypad can be displayed automatically when the user is in a position to type on the keypad. Further, if the user needs to view obstructed content while entering information using the keypad, the user can adjust a relative position of one or more features, such as by lifting the user's thumbs or moving a fingertip away from the device, in order to increase the transparency of the keypad and enable the user to view content "underneath."

Figure 4:
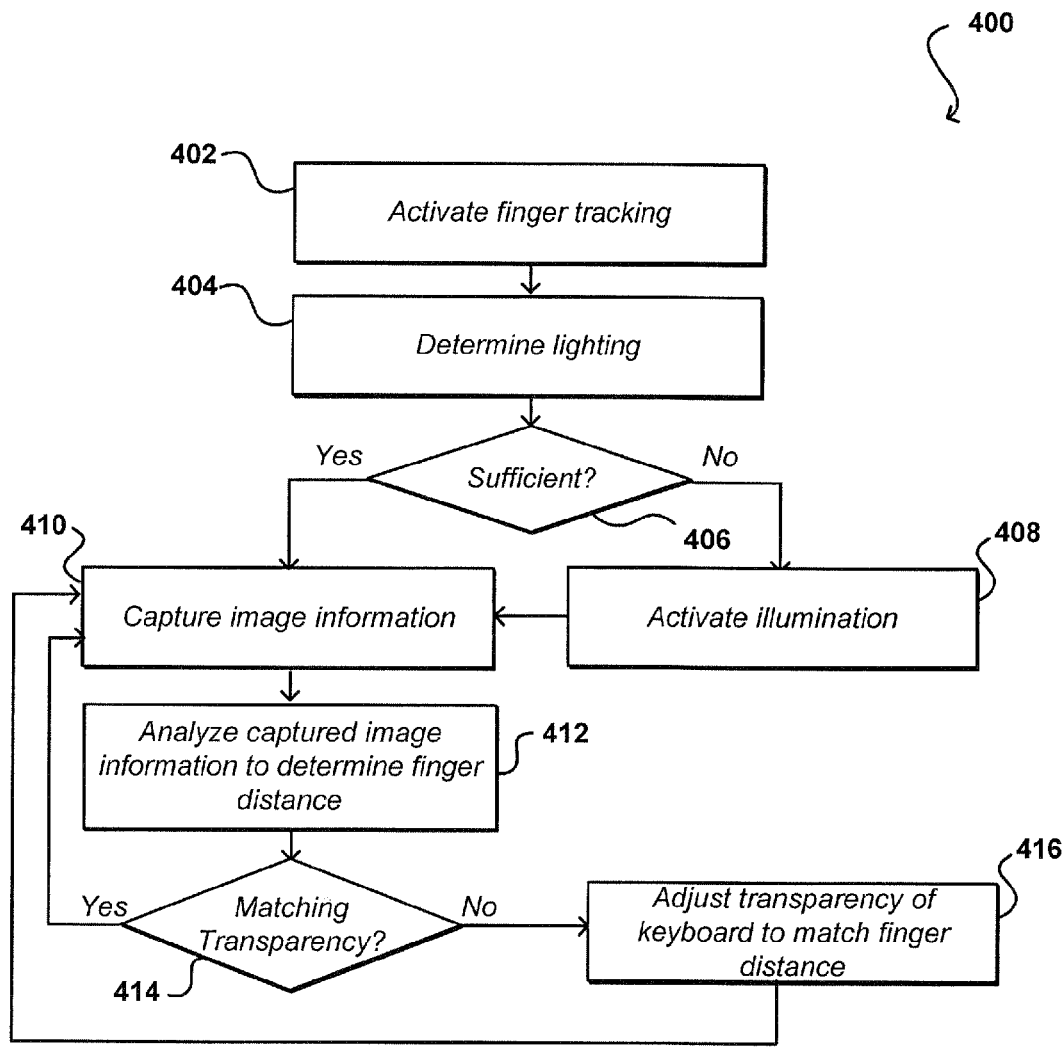
FIG. 4 illustrates an example process for adjusting the transparency of a virtual keypad that can be used in accordance with various embodiments.

FIG. 4 illustrates an example process 400 for controlling the transparency of a keypad or other interface element that can be used in accordance with various embodiments. It should be understood that, for any process discussed herein, there can be additional, fewer, or alternative steps performed in similar or alternative orders, or in parallel, within the scope of the various embodiments unless otherwise stated. In this example, finger tracking is activated 402 on a computing device. The tracking can be activated manually, by a user, or automatically in response to an application, activation, startup, or other such action. Further, the feature that the process tracks can be specified or adjusted by a user, provider, or other such entity, and can include any appropriate feature such as a fingertip, hand, thumb, elbow, or other such feature. In at least some embodiments a determination can be made 404 as to whether there is sufficient lighting for image capture and analysis, such as by using a light sensor or analyzing the intensity of captured image information. In at least some embodiments, a determination 406 that the lighting is not sufficient can cause one or more types of illumination to be activated 408 on the device. In at least some embodiments, this can include activating one or more white light LEDs positioned to illuminate a feature within the field of view of at least one camera attempting to capture image information. As discussed elsewhere herein, other types of illumination can be used as well, such as infrared (IR) radiation useful in separating a feature in the foreground from objects in the background of an image.

During the process, one or more selected cameras can capture 410 image information as discussed elsewhere herein. The selected cameras can have fields of view that include at least a portion of the region near a display element or other specified area of the device, such that the cameras can image a feature when approaching that element or area. The captured image information, which can be a series of still images or a stream of video information in various embodiments, can be analyzed 412 to attempt to determine the relative distance of a feature of interest, in this case a user's fingertip. As discussed elsewhere herein, various image recognition, contour matching, color matching, or other such approaches can be used to identify a feature of interest from the captured image information. When the feature is located and its relative distance determined, another determination can be made 414 as to whether a current transparency value or level of a virtual keypad (or other such element) matches or corresponds to that distance, as may be specified by a transparency function or mapping, etc. If the transparency matches the distance, the device can continue to monitor the distance in the captured image information. If the transparency does not match the distance, the transparency level of the keypad can be adjusted 416 to match the determined finger distance, which can include increasing or decreasing a transparency level, displaying an opaque keypad, and/or not rendering a keypad based on various distances or distance ranges. In some embodiments there can be distinct and/or discrete ranges that correspond to specific transparency levels, while in other embodiments there can be a continuous function with respect to distance, such as a linear or non-linear adjustment in transparency between a first distance (e.g., two inches) and a second distance (e.g., one quarter inch) from a display element. In some embodiments the keypad or keyboard is always at least partially transparent such that content is never fully obscured by the keypad. Further, in some embodiments the transparency level can be based on a distance from a user's right hand to the device, for example, and the keypad is in a least transparent state when the user is holding the device (or the hand is otherwise contacting the device), regardless of a position of a thumb or forefinger that will actually do the typing. Such an approach enables the left hand to interact with the content on the display when the right hand is away from the device. Various other approaches can be used as well as discussed or suggested elsewhere herein.

In at least some embodiments, the transparency can also be controlled by other inputs, such as where the user wants to continue typing or using a current hand configuration. For example, for devices with a touch sensitive casing the user can slide a finger along an edge of the device in one direction to increase the transparency and another direction to decrease the transparency of an element. A user can also provide spoken voice commands, tilt the device to utilize electronic gyroscope information, or take advantage of another such approach. Further, approaches can be used other than transparency or size adjustments. For example, a keypad can "fly" in from a corner of the device, appear a portion at a time, be printed as a grid of lines, or utilize another such approach. In some embodiments, the position at which a keypad is displayed can be adjusted as well based upon user hand position. For example, when the user's hand gets to a distance where a keypad is to start being displayed, or the transparency adjusted, the keypad can be displayed in a region of the screen (e.g., top, bottom, corner, etc,) corresponding to the relative location of the user's hand. In at least some embodiments the position of a keypad or other element can be shifted until the user's hand gets to a certain distance, at which point the keypad can lock into place so the user can direct his or her thumb or finger to the appropriate first letter or key, etc.

Figure 5A:
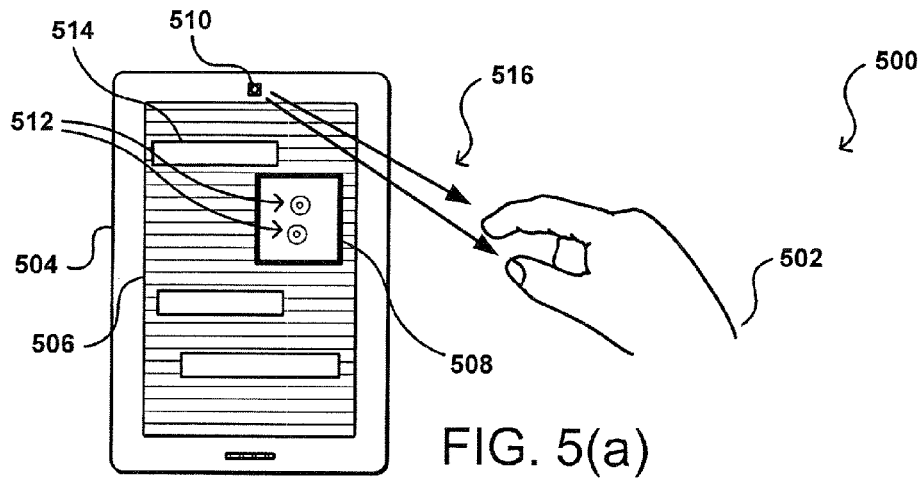
FIGS. 5(a), 5(b), and 5(c) illustrate an example approach for selecting and/or moving interface objects that can be used in accordance with various embodiments.

While approaches discussed above can assist with the ability to view content that might otherwise be obscured by an interface element, for example, there are other issues with utilizing interfaces on computing or electronic devices with relatively small display screens or input elements as well. For example, FIG. 5(a) illustrates an example state 500 of a computing device 504 wherein a significant amount of content is displayed on a display element 506 of the device. The content can include a variety of different items, such as text, images, input fields, selectable elements, embedded video, and other such items. Due to the relatively small size of the display, the size of each of these elements can be relatively small with respect to a user's finger, which can make them relatively difficult to select. In other cases, a user might want the ability to select a field or element before the user contacts the device in order to save time for text entry or other such operations. For example, the user might want to type text into a particular text box 508 displayed on the screen. Using a conventional approach, the user would have to accurately touch the element on the screen in order to select that element.

Approaches in accordance with various embodiments can instead take advantage of imaging and feature tracking approaches discussed herein to enable a user to select an element or perform an action without contacting the device. For example, in FIG. 5(a) it is illustrated that the user's hand 502 is a distance from the device but within a field of view of at least one camera 510 of the device. In addition to being able to determine the distance of the hand from the device, the device can also determine a relative position of the hand and track relative motion with respect to the device. For example, the device can determine whether the user is moving his or her hand up or down, right or left, and any combination thereof, and can map or correlate that motion to positions on the display element. For example, if the user would like to select a text box 508 but currently has a hand position associated with a different element 514 in the FIG. 5(a), the user would have to move his or her hand down and to the right (in the figure) to a location associated with the desired text box 508.

There can be a variety of ways to enable the user to track the input location associated with the user's current hand position. For example, as illustrated in FIG. 5(a) the text box 508 could have a highlight, bolded border, flashing element, or other indicia indicating that the text box corresponds to a current location of the user's hand based on the direction information 516 obtained by the camera 510 of the device. Such indicia can enable the user to know that the performance of a selection action will select that particular element. Alternatively, or in addition, the device can track one or more positions, such as may correspond to a fingertip and/or thumb of the user, and can show cursors 512 or other such graphical elements on the display that correspond to the tracked location of each feature. Such an approach can not only provide information as to the element that is selectable for the current hand position, but can also provide the user with a better indication of how the current hand position maps to the display area and how far a user will have to move to select a different element. Various other approaches can be used as well as should be apparent in light of the present disclosure.

The tracking of relative position enables the device to determine where a user might want to provide input, but as discussed the user may need to provide some indication that the user actually wants to provide input at a particular location. For example, a user's hand might cross over five different elements on an interface, but the user needs to provide the device with some way of determining the element in which the user is interested. Certain embodiments can utilize a dwell or rest time of the hand, such that if the user keeps his or her hand still for a period of time while in a position associated with an element, the device can automatically select that element. Such an approach may not be desirable in all situations, however, as a user resting his or her hand in a certain position could inadvertently cause the device to register input, which can be frustrating to the user, or at least degrade the user experience.

Figure 5B:
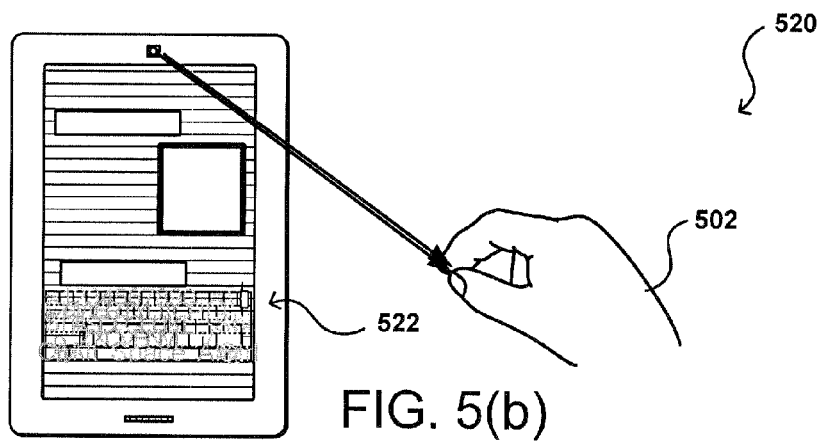

In some embodiments a user can provide an indication by performing an action with the user's other hand, such as by squeezing a side of the device, pressing a button or interface element, speaking a verbal command, or performing another such action. In this particular example, however, the user is able to take advantage of the fact that the user's hand position is already being captured and analyzed in image information to utilize a specific gesture or more to provide the indication. For example, in FIG. 5(a) the user's fingertip and thumb are separated by a given distance, as may be determined by the vectors 516 used to determine relative position. In FIG. 5(b), on the other hand, the user has brought the fingertip and thumb together, such that the vectors 524 substantially overlap, or the positions are separated by less than a specified separation distance, such that it can be determined that the user brought those points together. The gesture of bringing the tip of the index finger and the tip of the thumb (or another such digit combination) can be recognized by the device as a "pinch" or "clutch" type gesture, for example, which can indicate to the device that the user means to select or otherwise provide input with respect to an element corresponding to the user's current relative hand (or finger/thumb) position. Examples of algorithms and approaches for detecting gestures can be found, for example, in co-pending U.S. patent application Ser. No. 13/170,164, entitled "Camera-Based Sensor for Motion Detection," filed Jun. 27, 2011, which is hereby incorporated herein by reference. In FIG. 5(b), the user performing the gesture at that location indicates that the user wishes to select the text box 508 corresponding to that location. Such an approach enables the user to select that element without having to physically contact the screen or device.

In response to selecting a particular element, one or more actions can be taken that can depend at least in part upon the type of element selected. In this example the user selected a text box that can be used for text entry. The input can indicate to the device that the user wishes to provide text input in that text box, and can trigger the display of a virtual keypad 522 or other such element on the display. The user can then type directly on the keyboard and the text will be entered into the selected text box. As illustrated, the keypad can also have a level of transparency determined by the relative distance at which the gesture was performed, using any of the processes discussed or suggested elsewhere herein. In this way, a user can select an element based on lateral position while the corresponding action will be controlled (or controllable) by the distance of that gesture and/or subsequent movement of the user's hand or other such features. In this example, a user can perform a pinch gesture to select a text box, then type input using the virtual keypad 522. When the user then pulls away, the device in some embodiments will de-select that text box when the user withdraws to the point that the keypad is no longer rendered or is in a most transparent state, such that the user also does not have to manually disengage the keypad or deselect the text box. Various other approaches for deselecting the text box can be used as well, such as by moving the user's hand position so the text box no longer corresponds to the selection location. In some embodiments, a user can perform a gesture or action, such as to move the user's hand to an upper right corner of the device at the end of text entry, to signal that the text box should be deselected. Various other such gestures or actions can be utilized as well.

Figure 5C:
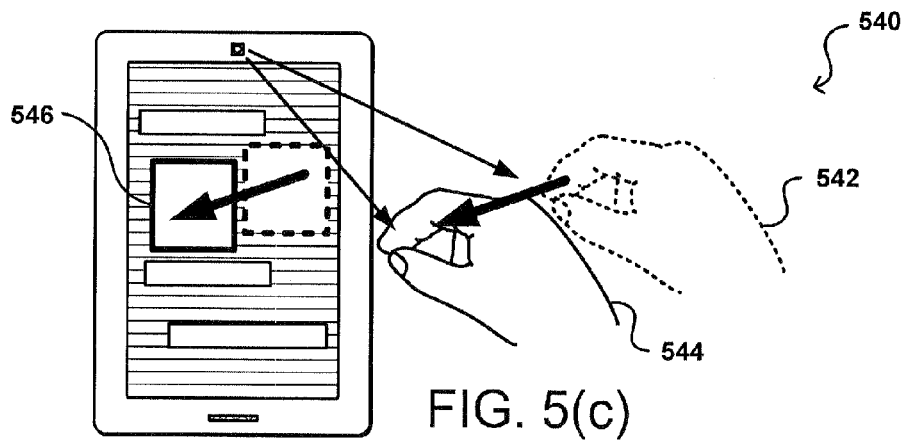

Various other actions can be taken as well for various types of objects or elements. For example, FIG. 5(c) illustrates a state 540 wherein the user has performed a pinch gesture to select an object 546. Instead of bringing up a virtual keypad, however, the action in this example enables the user to "grab" that object and "drag" it to another location on the interface. As illustrated, the user can move the hand performing the gesture from a first position 524 to a second position 544, causing the object 546 to move along a similar path. When the object is at the position the user intends, the user can separate the finger and thumb to end the gesture and "drop" the object in that location. Various other actions can be performed in response to user selections as should be obvious to one of ordinary skill in the art in light of the teachings and suggestions contained herein.

Figure 6:
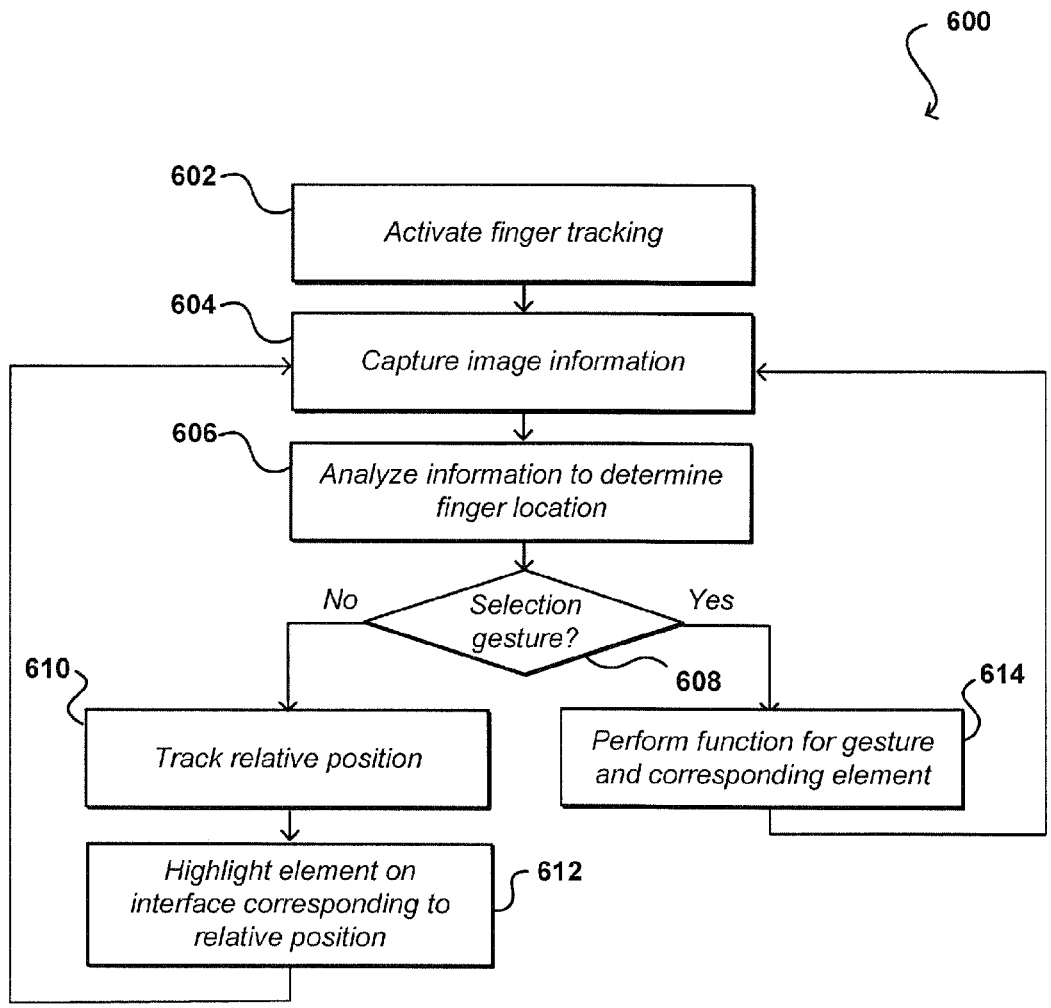
FIG. 6 illustrates an example process for manipulating an interface element that can be performed in accordance with various embodiments.

FIG. 6 illustrates an example process 600 for selecting an item of a user interface that can be utilized in accordance with various embodiments. In this example, finger tracking is activated 602 on the device, with image information being captured 604 and analyzed 606 to determine relative finger location, such as is described above with respect to the process of FIG. 4. In addition, however, the process in this example also attempts to determine 608 whether a selection gesture (or other such action) is being performed by the user. In some embodiments this can involve determining when two features are brought to within a certain range or distance of each other, such as a fingertip and a thumb forming a clutch gesture. In other embodiments the device might look for a certain hand formation or path of motion to recognize a gesture, among other such actions. If a selection action is not being performed, the relative position of the hand or feature can be tracked 610 and/or updated, and where applicable an element in the interface corresponding to the current hand or feature position can be highlighted 612 or otherwise indicated via the interface. If it is determined that a selection gesture is being performed, a corresponding action or function can be performed 614 or executed on the device, such as to select an element, launch a keypad display, etc. As discussed, in some embodiments the image information might be used to track the relative position of a hand or feature but another type of selection action can be performed, such as to squeeze the device, slide a finger along an edge of the device, or provide audio command input.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the hand from various other objects in an image, and would have to identify the hand as a hand, regardless of the hand's orientation. Such an approach can require shape or contour matching, for example, which can still be relatively processor intensive. A less processor intensive approach can involve separating the hand from the background before analysis.

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time. A further benefit is that the human eye is a retro-reflector and the pupils will show as bright spots in the reflected IR, such that the eyes can also potentially be easily separated from the background in at least some embodiments.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

It also should be understood that, in addition to information such as zoom level and field of view, it can also be important in at least some embodiments for the software to know the relative position of the cameras or other image capture elements on the device. For example, image information can be analyzed to determine directions or position vectors to features, but those determinations are relative to a center point (or other position) of the camera capturing that image information. In order to properly combine the vectors from different images to determine an intersection point, the separation between the cameras capturing those images should also be taken into account in at least some embodiments. Various approaches for three-dimensional mapping or modeling using stereoscopic imaging or other such approaches based at least in part upon camera separation can be used as known or used in the art. Other approaches such as active capacitive, passive capacitive, and ultrasonic approaches can be used for finger detection, and processes such as ambient or IR imaging, at one or more wavelengths, can be used for eye detection, among other such processes.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 7:
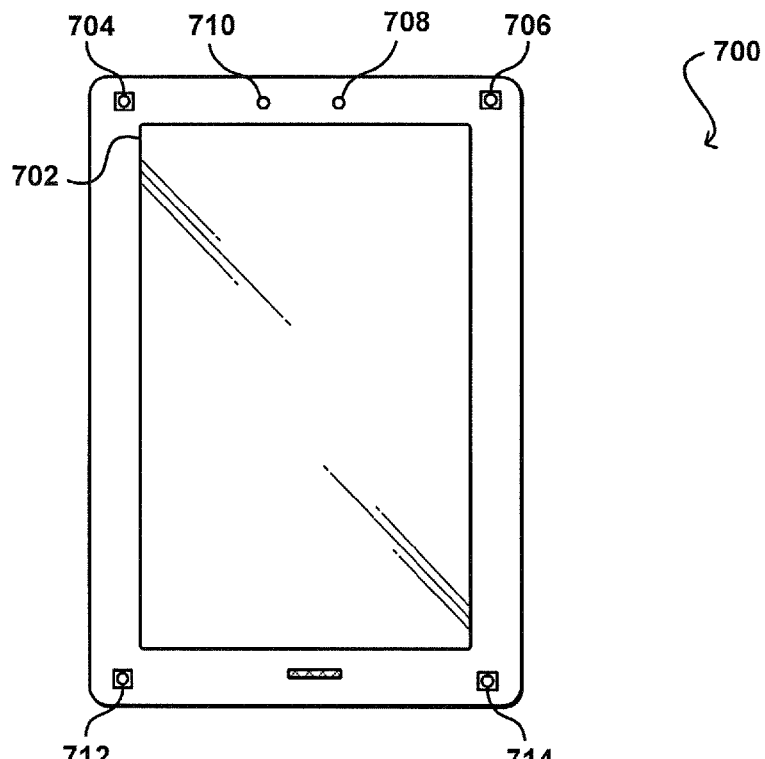
FIG. 7 illustrates an example computing device that can be used in accordance with various embodiments.

FIG. 7 illustrates an example computing device 700 that can be used to perform methods in accordance with various embodiments discussed and suggested herein. In this example, the device has four image capture elements 704, 706, 712, 714 positioned at various locations on the same side of the device as a display element 702, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 708 is included that can be used to determine an amount of light in a general direction of objects to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 8:
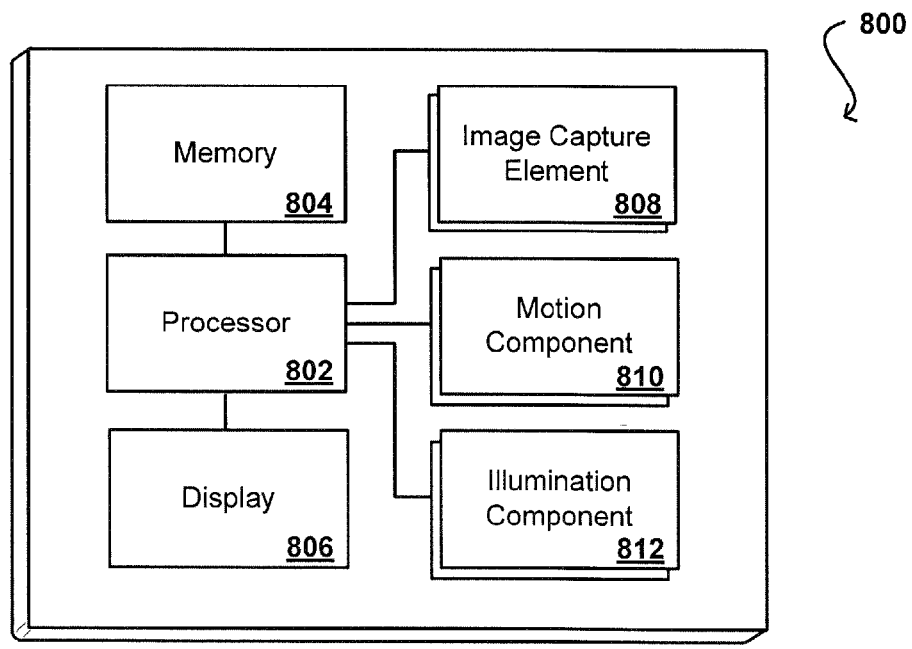
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 810, such as an electronic gyroscope used to determine motion of the device for assistance in input determination. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user.

This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
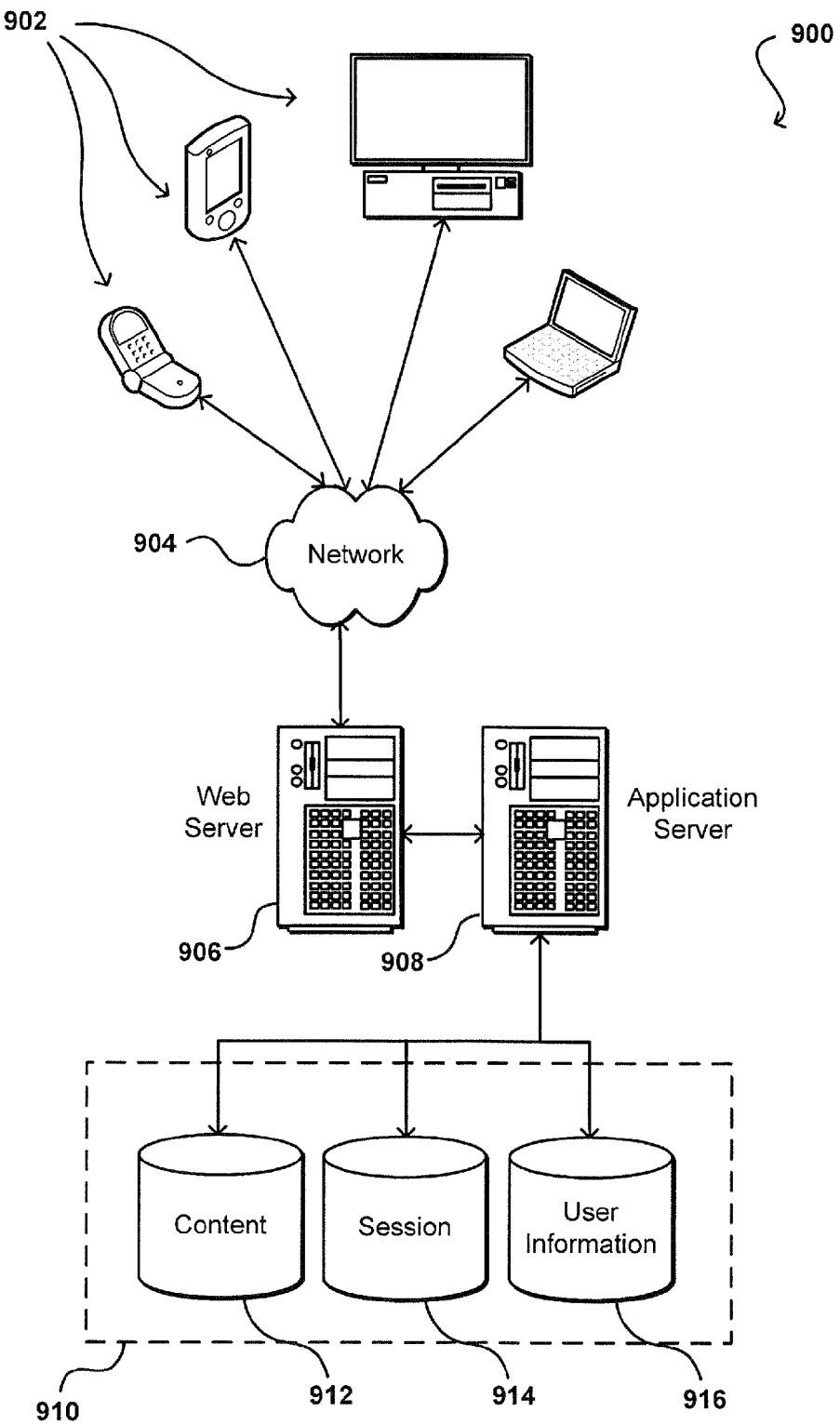
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of enabling text input, comprising:
   receiving text input to a computing device via a user feature over an initial period of time;
   determining a max input distance corresponding to a maximum distance between a display screen of the computing device and the user feature over the initial period of time; and
   over a subsequent period of time,
      capturing image information using a camera of the computing device;
      analyzing the image information, using a processor of the computing device, to track a relative position of the user feature;
      detecting the user feature beyond the max input distance;
      causing an interface feature to be displayed over content on a user interface, the interface feature having a transparency level corresponding to a distance of the relative position of the user feature beyond the max input distance and enabling the content to be viewed through the interface feature;
      adjusting, using the processor, the transparency level of the interface feature according to changes in the distance of the relative position of the user feature with respect to the display screen over a transparency adjustment range, a shorter distance within the transparency adjustment range resulting in more opacity; and
      setting the transparency level to an opaque state and enabling a user to provide input using the interface feature based at least in part on the user feature being determined to be within the max input distance.

2. The computer-implemented method of claim 1, further comprising:
   enabling the user to select an interface element of the user interface displayed on the display screen by adjusting the relative position of the user feature with respect to the computing device and performing a selection gesture based at least in part on the relative position corresponding to the interface element to be selected, a range of relative positions within a field of view of the camera being mapped to a range of locations of the user interface,
   wherein the selection gesture includes bringing a tip of a finger and a tip a thumb on a hand of the user into contact, the contact being determined by analyzing the image information.

3. The computer-implemented method of claim 2, further comprising:
adjusting at least one displayed aspect of the interface element based at least in part on the relative position of the user feature corresponding to a mapped location of the interface element in the user interface.

4. The computer-implemented method of claim 1, wherein the interface feature is fully transparent or not rendered when the user feature is beyond the transparency adjustment range.

5. The computer-implemented method of claim 1, wherein the transparency adjustment range is configurable by the user, and wherein the max input distance is based at least in part on one of the max input distance or a multiple of the max input distance.

6. The computer-implemented method of claim 1, wherein the camera is unable to view the user feature located within a blind spot region near the display screen, the interface feature being displayed in the opaque state based at least in part on the user feature being within a blind spot range of the display screen.

7. The computer-implemented method of claim 1, further comprising:
adjusting a location at which the interface feature is displayed on the display screen based at least in part on the relative position of the user feature.

8. A computer-implemented method of enabling input on an electronic device, comprising:
displaying content on a display screen of the electronic device;
receiving text input to the electronic device via a user feature over a first period of time;
determining a max input distance corresponding to a maximum distance between the electronic device and the user feature over the first period of time; and
over a second period of time after the first period of time, receiving a first input from a user,
detecting the user feature beyond the max input distance and causing an interface feature to be displayed on the display screen with an initial transparency level, the initial transparency level enabling at least a portion of the content to be viewable through the interface feature;
detecting the user feature within the max input distance and adjusting a transparency level of the interface feature displayed on the display screen based at least in part on a distance between the user feature and the electronic device, a shorter distance resulting in a lower transparency level; and
enabling the user to provide additional input to the electronic device using the interface feature based at least in part on the interface feature being in a least transparent state.

9. The computer-implemented method of claim 8, further comprising:
capturing image information using a camera of the electronic device; and
analyzing the image information to track a relative position of the user feature,
wherein the relative position corresponds to a second input from the user.

10. The computer-implemented method of claim 9, wherein the second input corresponds to at least one of a squeeze input of a casing of the electronic device, motion of the electronic device, a pressing of a button on the electronic device, a sliding of an object against a touch sensitive area on the electronic device, or a command spoken by the user.

11. The computer-implemented method of claim 9, wherein the first input and the second input are provided using different features of the user or an object held by the user.

12. The computer-implemented method of claim 11, wherein at least one of the different features is located in the image information using at least one of an image recognition algorithm, a contour matching algorithm, a texture matching algorithm, or a color matching algorithm.

13. The computer-implemented method of claim 8, further comprising:
analyzing captured image information to detect a selection gesture performed by at least the user feature, the selection gesture and a relative position of the user feature corresponding to the first input.

14. The computer-implemented method of claim 8, wherein the first input corresponds to at least one of a squeeze input of a casing of the electronic device, motion of the electronic device, a pressing of a button on the electronic device, or a command spoken by the user.

15. The computer-implemented method of claim 8, wherein at least one of the first input or a second input is determined using at least one of (a) a pair of cameras performing stereoscopic imaging, (b) a camera and a distance sensor determining a relative position and a relative distance of the user feature with respect to the electronic device using still or video image information, or (c) a single camera providing information useful in estimating a relative size of a feature in captured image information.

16. The computer-implemented method of claim 8, wherein the least transparent state corresponds to an opaque state.

17. A computing device, comprising:
a device processor;
a display screen; and
a memory device including instructions operable to be executed by the device processor to perform a set of actions, enabling the computing device to:
display content on the display screen;
receive text input to the computing device via a user feature over a first period of time;
determine a max input distance corresponding to a maximum distance between the computing device and the user feature over the first period of time; and
over a second period of time after the first period of time, receive a first input from a user;
detect the user feature beyond the max input distance and cause an interface element to be displayed on the display screen with an initial transparency level, the initial transparency level enabling at least a portion of the content to be viewable through the interface element;
detect the user feature within beyond the max input distance and adjust a transparency level of the interface element displayed on the display screen based at least in part on a distance between the user feature and the computing device, a shorter distance resulting in a lower transparency level; and
enable the user to provide additional input to the computing device using the interface element based at least in part on the interface element being in a least transparent state.

18. The computing device of claim 17, further comprising:
at least one motion determining element operable to determine motion of the computing device during at least one of the first input or a second input, the computing device operable to account for the motion when determining at least one of the first input or the second input.

19. The computing device of claim 17, further comprising:
a touch sensitive material around at least a portion of the computing device enabling the user to provide at least one of the first input or a second input.

20. The computing device of claim 17, wherein the instructions when executed further cause the computing device to:
capture image information using a camera of the computing device; and
analyze the image information to track a relative position of the user feature,
wherein the relative position corresponds to a second input from the user.

21. The computing device of claim 20, wherein the instructions when executed further cause the computing device to:
analyze the image information to detect a selection gesture performed by at least the user feature, the selection gesture and the relative position of the user feature corresponding to the first input.

22. A non-transitory computer-readable storage medium storing instructions that, when executed by at least one processor of a computing device, cause the computing device to:
receive text input to a computing device via a user feature over an initial period of time;
determine a max input distance corresponding to a maximum distance between a display screen of the computing device and the user feature over the initial period of time; and
over a subsequent period of time,
capture image information using a camera of the computing device;
analyze the image information to track a relative position of the user feature;
detect the feature beyond the max input distance;
cause an interface element to be displayed over content on a user interface displayed on a display screen of the computing device, the interface element having a transparency level corresponding to a distance of the relative position of the user feature beyond the max input distance and enabling the content to be viewed through the interface element;
adjust the transparency level of the interface element proportional to changes in the distance of the relative position of the user feature with respect to the display screen over a transparency adjustment range, a shorter distance within the transparency adjustment range resulting in a lower transparency level; and
set the transparency level to a least transparent state and enable the user to provide input using the interface element based at least in part on the user feature being determined to be within the max input distance.

23. The non-transitory computer-readable storage medium of claim 22, wherein the instructions when executed further cause the computing device to:
enable the user to select an input element of the user interface displayed on the display screen by adjusting the relative position of the user feature with the respect to the computing device and performing a selection gesture based at least in part on the relative position corresponding to the input element to be selected, a range of relative positions within a field of view of the camera being mapped to a range of locations of the user interface, the interface element being caused to be displayed based at least in part on a selection action.

24. The non-transitory computer-readable storage medium of claim 23, wherein the selection gesture includes bringing a tip of a finger and a tip of a thumb on a hand of the user into contact, the contact being determined based at least in part on analysis of the image information.

25. The non-transitory computer-readable storage medium of claim 23, wherein the instructions when executed further cause the computing device to:
adjust at least one displayed aspect of the input element based at least in part on the relative position of the user feature corresponding to a mapped location of the interface element in the user interface.

* * * * *